A. BUSSE.
RAIL JOINT.
APPLICATION FILED APR. 24, 1908.
1,010,411.
Patented Dec. 5, 1911.
2 SHEETS—SHEET 2.
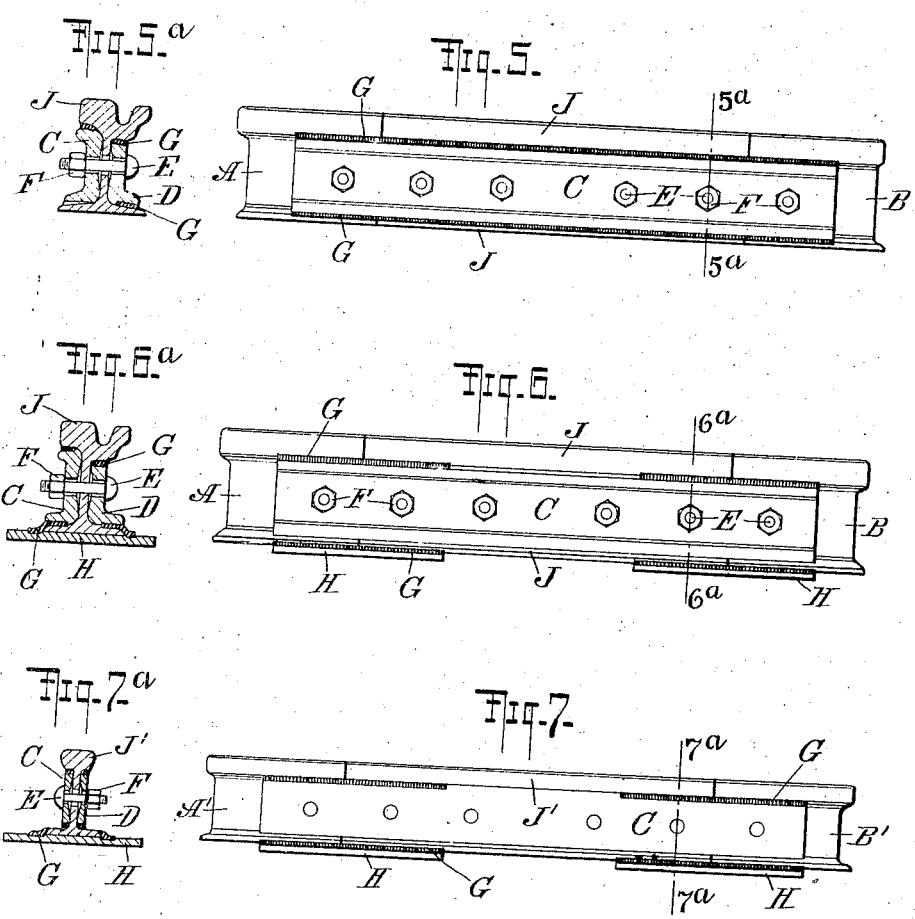
WITNESSES:
G. V. Rasmussen
John Lotka
INVENTOR
Arthur Busse
BY
Briesen & Knauth
ATTORNEYS

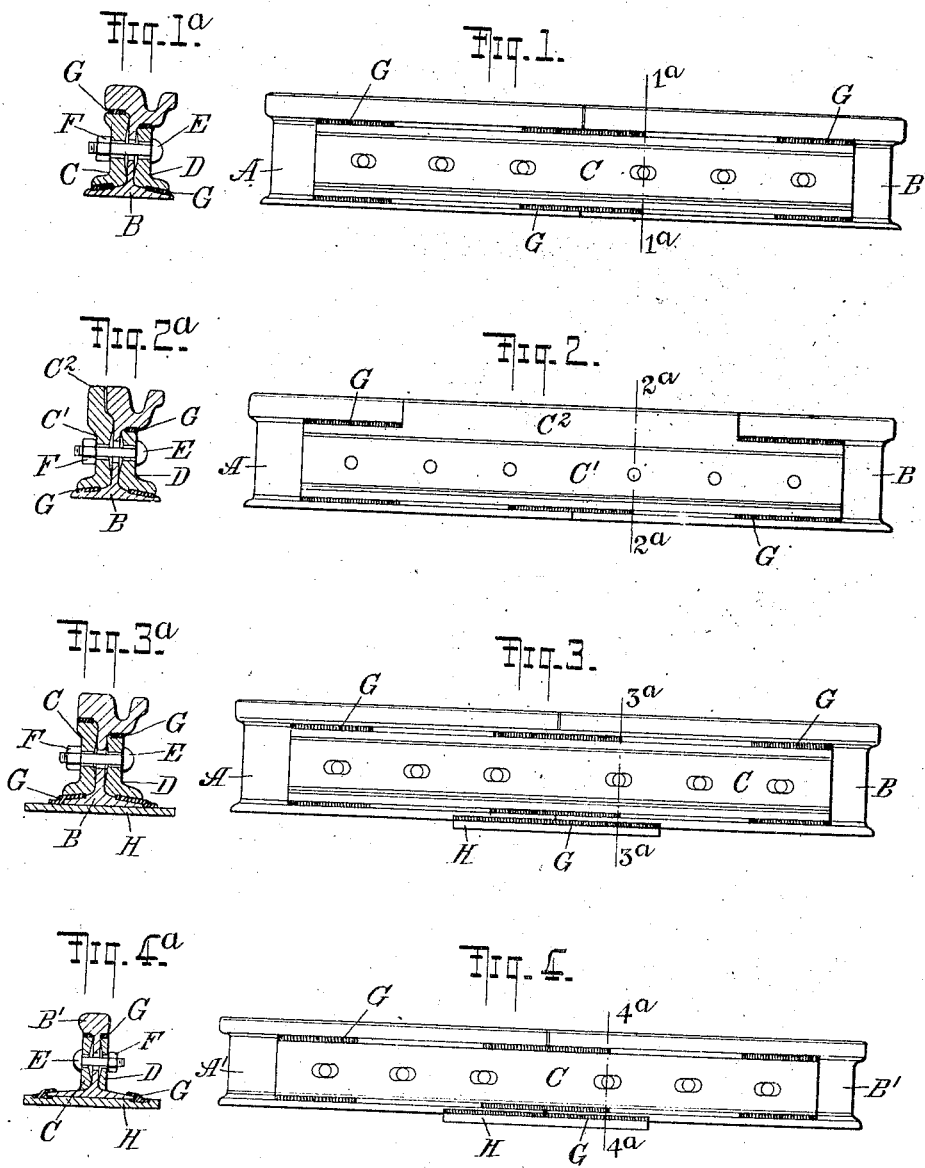

UNITED STATES PATENT OFFICE.

ARTHUR BUSSE, OF CHARLOTTENBURG, GERMANY.

RAIL-JOINT.

1,010,411.  Specification of Letters Patent.  Patented Dec. 5, 1911.

Application filed April 24, 1908. Serial No. 428,912.

*To all whom it may concern:*

Be it known that I, ARTHUR BUSSE, a subject of the Emperor of Germany, and resident of Charlottenburg, Germany, have invented certain new and useful Improvements in Rail-Joints, of which the following is a specification.

My invention relates to rail joints and has for its object to provide a secure connection which will be less liable to breakage than constructions used hitherto, which can be easily repaired, and which will also perform the functions of an electric rail bond.

Various ways of carrying out my invention are illustrated in the accompanying drawings, in which—

Figures 1, 2, 3, 4, 5, 6 and 7 are side elevations of such rail joints, and Figs. 1ª, 2ª, 3ª, 4ª, 5ª, 6ª and 7ª corresponding cross sections.

In Figs. 1 and 1ª, A and B are two adjacent rails against which lie fish plates C and D of substantially the usual construction, held together against the web of the rail by means of bolts such as E and nuts such as F. So far the construction need not differ from the usual rail joint.

According to my invention the brazing metal G. which is used in brazing, is applied between the lower surfaces of the rail heads and the upper surfaces of the rail bases, and the adjacent surfaces of the fish plates.

In the particular construction shown in Figs. 1 and 1ª, the brazing material is applied, not along the entire length of the fish plates, but only at the ends thereof and also at the central portion, that is, at the ends of the rails A and B.

The construction shown in Fig. 2 and 2ª is very similar to that described above, the difference being chiefly in the shape of the one fish plate C′, which is provided with an extension C² flush with the upper surface of the rail heads, and, moreover the brazing material is applied at only two points (that is, at the ends) of the upper surface of said fish plate C′ below the heads of the rails A and B.

The construction in Figs. 3 and 3ª differs from that illustrated by Figs. 1 and 1ª by the addition of a plate H below the bases of the two rails at the joint, said plate being brazed to the rail bases by the brazing metal G. Figs. 4 and 4ª illustrate the application of the same construction to T rails A′, B′ instead of the grooved rails shown in Figs. 1 to 3.

It is well known that in ordinary track construction the heads of the rails are worn down considerably at the joints. To remedy this I may cut out the worn portion of the rails and insert by brazing a new rail section J and then proceed in substantially the same manner as above described. Thus in Figs. 5 and 5ª the fish plates C, D are brazed to the rail heads and rail bases in substantially the same manner as in Fig. 1, except that the brazing material in Fig. 5 is applied along the entire length of the fish plates. In Figs. 6 and 6ª the brazing material is applied only to the ends of the fish plates, preferably in such a manner as to bridge the brazed joints between the inserted rail section J and the heads of the rails, and said figure also shows the use of the brazed plates H under the bases of the rails A and B preferably vertically beneath the joints of the rail head J with the said rails. Figs. 7 and 7ª illustrate the application of the same construction to a T rail with an inserted head portion J′. If desired the nuts F may be brazed or welded so as to prevent them from becoming loose, and the heads of the bolts E may likewise be brazed fast.

My above described invention provides a very superior track construction, the upper surface of the rail heads remaining in good condition always. The brazed joints are so located that even the unlikely occurrence of a break at the joint would not be dangerous, since the fish plates would still hold the rails together. The construction is strong and applicable to regular steam railroads, and not only to street railways. Very little time is required for making repairs. The laying of the track would not differ much from the usual practice. It is also clear that the harmful depression of the rail ends at the joints (under the weight of the rolling stock) will be reduced very much, as the brazing is extended a material distance lengthwise of the rails, and not simply applied to the joints. Worn-out tracks can be rendered serviceable in a short time and at a very slight cost, by cutting out the worn portions and inserting rail sections, which are then brazed as described. The construction is of course not only applicable where the track is embedded, but also at crossings, switches, on bridges, etc. The improved connection also forms an electric bond. When the invention is applied to steam railroads, expansion joints should preferably be provided at suitable intervals. The plates brazed beneath the rail bases at the joints also increase the strength of the connection, as does the brazing of the bolt heads and nuts. In case of need, the brazed joints can be severed by pneumatic chisels or other suitable tools.

While I have spoken of uniting the rail ends to one another, the fish-plates to the rails and the bolts to the fish-plates and rails by brazing, I intend to claim any equivalent method of intimate joining, such as welding or fusing.

I claim as my invention:

1. A rail joint comprising abutting rail ends and a fish plate at the side of said ends, said plate being brazed along its top and bottom edges to rail heads and bases respectively and in contact as to one side with the sides of said rails, as and for the purpose described.

2. A rail joint comprising rail ends and a fish plate at the side of said ends, said plate having brazed regions along its top and bottom edges uniting it to said ends alternating with regions free from brazing one side of said plate being in contact with the sides of said rails, as and for the purpose described.

3. A rail joint comprising abutting rail ends and a fish plate at the side of said ends, said plate being brazed along its top and bottom edges to rail heads and bases respectively and one side of said plate being in contact with the sides of said rails but free from brazing, said plate being also secured to said rail ends by bolts and nuts, as and for the purpose described.

4. A rail joint comprising adjacent rail ends, an inserted rail section between said ends and brazed thereto and fish plates secured to the rail ends and to the inserted section by bolts and nuts and also by being brazed thereto along their top and bottom edges in regions alternating with regions free from brazing, as and for the purpose described.

In testimony whereof I have hereunto set my hand in the presence of two subscribing witnesses this 31st day of March, 1908.

ARTHUR BUSSE.

Witnesses:
HENRY HASPER,
WOLDEMAR HAUPT.